United States Patent [19]

Thomas

[11] Patent Number: 5,405,054
[45] Date of Patent: Apr. 11, 1995

[54] FROZEN CONFECTION DISPENSING APPARATUS

[75] Inventor: Donald J. Thomas, Carmel, Ind.

[73] Assignee: FedPak Systems, Inc., Indianapolis, Ind.

[21] Appl. No.: 657,625

[22] Filed: Feb. 20, 1991

Related U.S. Application Data

[63] Continuation of Ser. No. 413,769, Sep. 28, 1989, abandoned, which is a continuation-in-part of Ser. No. 273,101, Nov. 22, 1988, abandoned.

[51] Int. Cl.6 .............................................. B65D 35/28
[52] U.S. Cl. .................................... 222/95; 222/105; 222/146.6; 222/326; 222/389; 62/391
[58] Field of Search .................................. 222/94–96, 222/105, 146.6, 144.5, 183, 386.5, 389, 387, 325, 326; 62/391, 377, 389, 252, 254; 312/236, 116; 220/DIG. 8

[56] References Cited

U.S. PATENT DOCUMENTS

| | | |
|---|---|---|
| 2,120,640 | 6/1938 | Craemer . |
| 2,242,407 | 5/1941 | Tobey .................... 62/254 |
| 2,401,417 | 6/1946 | Engle . |
| 2,408,704 | 10/1946 | Taylor . |
| 3,081,920 | 3/1963 | Gorychka et al. . |
| 3,155,281 | 11/1964 | Stracey . |
| 3,178,061 | 4/1965 | Giacalone et al. . |
| 3,288,333 | 11/1966 | Valk, Jr. .............. 222/386.5 X |
| 3,371,822 | 3/1968 | Galloway . |
| 3,435,996 | 4/1969 | Jones . |
| 3,677,443 | 7/1972 | Smadar et al. . |
| 3,826,409 | 7/1974 | Chilcoate . |
| 4,022,031 | 5/1977 | Calim ................... 222/406 |
| 4,163,802 | 8/1979 | Redfern et al. . |
| 4,213,545 | 7/1980 | Thompson et al. . |
| 4,231,492 | 11/1980 | Rios . |
| 4,293,082 | 10/1981 | Matsueda . |
| 4,386,717 | 6/1983 | Koob .................... 222/389 X |
| 4,423,829 | 1/1984 | Katz ..................... 222/386.5 |
| 4,452,823 | 6/1984 | Connolly et al. . |
| 4,458,830 | 7/1984 | Werdins ................ 222/386.5 |
| 4,484,697 | 11/1984 | Fry, Jr. ................. 222/386.5 X |
| 4,574,987 | 3/1986 | Halligan et al. . |
| 4,711,373 | 12/1987 | Christine ............... 222/327 X |
| 4,711,376 | 12/1987 | Manfroni . |
| 4,723,688 | 2/1988 | Munoz . |
| 4,753,371 | 6/1988 | Michielin et al. . |
| 5,048,724 | 9/1991 | Thomas .................. 222/95 |
| 5,069,364 | 12/1991 | McGill ................... 222/95 |

FOREIGN PATENT DOCUMENTS

| | | |
|---|---|---|
| 64-9587 | 1/1989 | Japan . |
| PCT/AU86/-00361 | 11/1986 | WIPO . |
| PCT/GB88/-01054 | 12/1988 | WIPO . |

*Primary Examiner*—Andres Kashnikow
*Assistant Examiner*—Philippe Derakshani
*Attorney, Agent, or Firm*—Charles G. Lamb

[57] ABSTRACT

A device for producing and dispensing frozen confection is provided. At least one collapsible bag assembly is disposed within a refrigerated compartment within the dispensing apparatus and means are provided to collapse the collapsible bag and dispense the soft served frozen confection therefrom. Moreover, the frozen confection dispensing apparatus includes means to store frozen confection therein in collapsible containers prior to use.

12 Claims, 7 Drawing Sheets

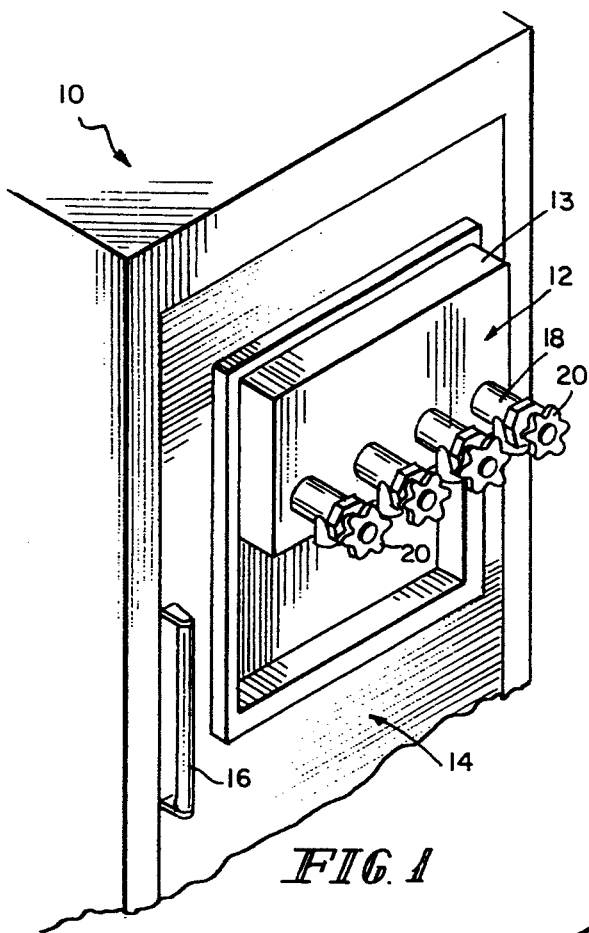
FIG. 1
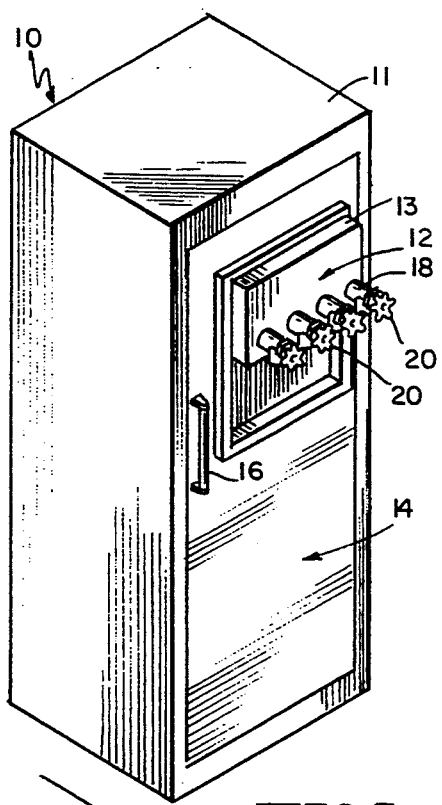
FIG. 3
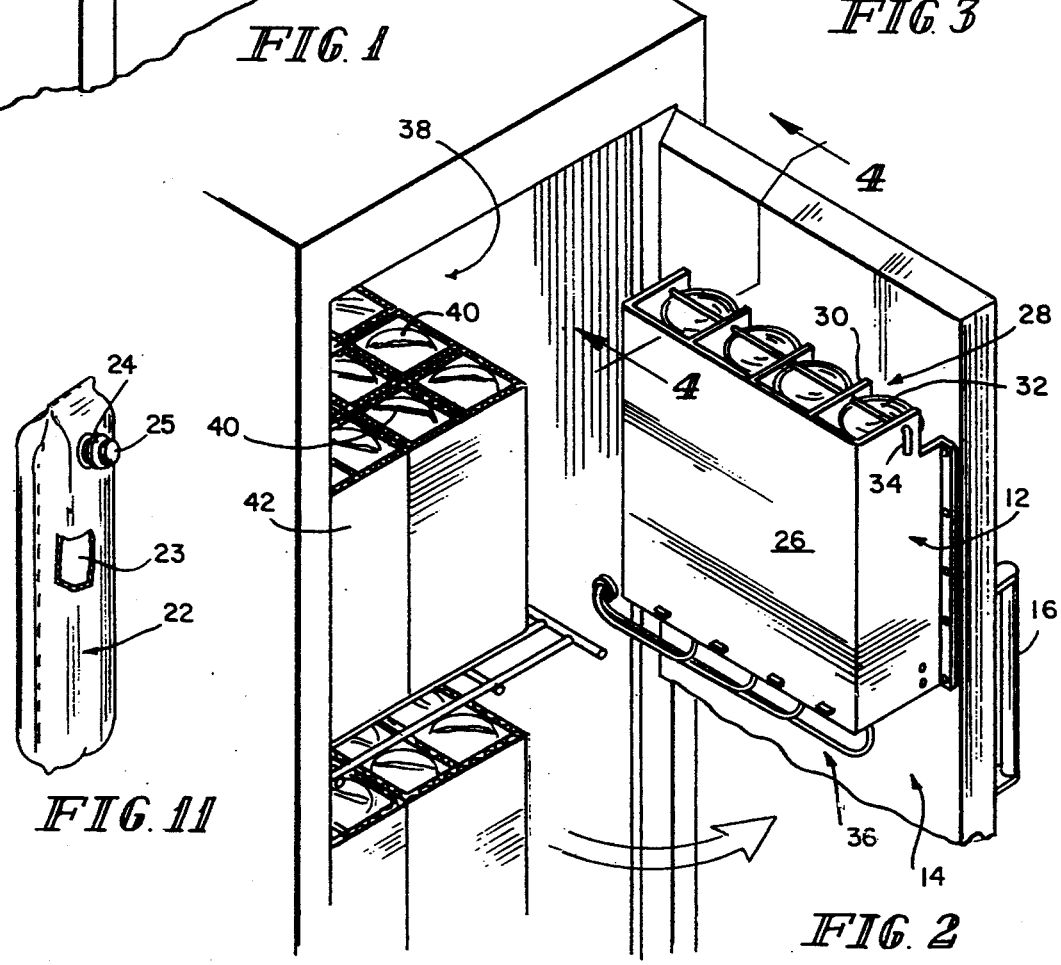
FIG. 11
FIG. 2

FROZEN CONFECTION DISPENSING APPARATUS

This application is a continuation of application Ser. No. 07/413,769, filed Sep. 28, 1989, now abandoned, which is a continuation-in-part of application Ser. 07/273,101, filed Nov. 22, 1988 now abandoned, which applications are incorporated herein

BACKGROUND AND SUMMARY OF THE INVENTION

This invention relates to an apparatus for dispensing soft serve food products such as ice creams, yogurts, sherbets, and other frozen dessert confections.

Soft serve frozen confections are widely used in the food industry and have a broad customer appeal. Although ice creams are the most widely known product dispensed in a soft serve form, an expanding market based on alternative frozen confections such as yogurts also exists. A soft serve confection is dispensed by extrusion into an edible cone or other suitable container, and is generally intended for immediate consumption.

A soft serve confection can be easily extruded from the dispensing apparatus in a variety of patterns or shapes. A common manner of dispensing a frozen confection consists of extruding a continuous ribbon or rod that can be coiled on itself to form a cone having a beehive shape. Soft serve confections ideally will have sufficient strength to retain the extrudate shape for a period of time, even when subjected to changes in orientation such as would occur during consumption.

The dispensing temperature of the soft serve frozen confection typically ranges from about 16° F. to 21° F. This temperature range is critical, with lower temperatures being characterized by difficulties in extrusion of the soft serve frozen confection, mechanical hardness, and inferior taste quality due to the adverse reaction of taste buds to a low temperature frozen confection, often resulting in a "burning" sensation. Temperatures higher than the normal soft serve confection-dispensing range result in a low viscosity product with undesirable rheological characteristics that do not permit retention of the extrudate shape and are unsuitable for later processing such as dipping in chocolate or crushed nutmeats.

Because of the critical narrow temperature range for soft serve frozen confections it is not feasible to transport the frozen confections at their normal dispensing temperature.

To overcome this problem, the food service industry presently utilizes on-site production of the soft serve frozen confections. The soft serve confection can be shipped from the manufacturer to the food product retailer as a powder, a refrigerated liquid, or in a frozen state. If the confection is not in a liquid state, it is converted to the liquid state at the site of the food product retailer. For example, a confection shipped in the frozen state is allowed to completely thaw to liquid form, or water is added to the powdered form. This liquid is converted on-site to a soft serve frozen confection by an agitated freezing process in a soft serve frozen confection dispenser.

Although on-site production of the soft serve frozen confection permits the successful manufacture and service of soft serve frozen confections, the method does present some problems of its own. The machinery necessary for on-site production is complicated and expensive. Scraper blades that agitate the frozen confection during its on-site formation require sharpening or replacement, and inadvertent freeze-up of the machinery is a continual worry. The cost in electricity for operating the freezing unit is substantial, and special heavy duty electric wiring may be necessary to handle the power requirements of the freezer. Because of the agitation process, addition of extra elements, such as nutmeats, candies or fruits, to the soft serve confection is normally impossible. Frequent regular cleaning of the parts of the frozen confection dispenser is also necessary to prevent blockage and reduce the chance of bacterial contamination.

A further disadvantage of the on-site production is the increased risk of bacterial contamination presented at each stage of the process. Although the liquid is refrigerated, the chance of bacterial contamination is greatly increased over the frozen form. This danger is increased by the possibility of improper cleaning of the machinery, which could result in a seed culture of bacteria capable of contaminating newly added liquid confection. Additionally, quality control of on-site producers of soft serve confections can be inferior as compared to a central manufacturer, resulting in uneven product appearance, taste, and form.

It is accordingly an object of the present invention to provide a soft serve frozen confection dispenser capable of extruding a soft serve frozen confection and suited for use in a commercial setting.

Another object of the invention is to provide a device for dispensing soft serve confections that is sanitary, mechanically simple, easy to clean, draws small amounts of electric power, and in specific embodiments is capable of portable use.

It is a further object of the present invention to provide a device that is capable of serving a soft serve frozen confection without the formation of undesirable ice crystals in the frozen confection.

Yet another object of the present invention is to provide a device that is capable of dispensing soft serve frozen confections which include extra flavoring ingredients such as fruit or candy pieces.

The present invention accordingly comprises a soft serve frozen confection dispenser that is capable of dispensing certain products such as yogurt in a soft serve form free of the undesirable characteristics formerly associated with such soft serve yogurt products.

Apparatus for use in dispensing frozen confection is provided according to the present invention. In one embodiment, such apparatus includes a bag assembly designed to store a predetermined quantity of frozen confection to be dispensed. The bag assembly includes a collapsible container and a sleeve around the container. The sleeve provides a girdle or corset means for the collapsible container.

The collapsible container is formed to include an interior chamber configured to hold either liquid or frozen confection therein. Prior to filling, the collapsible container is disposed in a longitudinally extending channel formed in the sleeve. The collapsible container expands radially about its longitudinal axis as it is filled with a partly frozen confection until it reaches a maximum girth controlled by the surrounding sleeve. The sleeve is undersized in diameter with respect to the container to cause the maximum girth of the filled collapsible container to be less than the girth the container would otherwise have if the container were not placed in the sleeve as the container was being filled with partly frozen confection. Essentially, the sleeve behaves like a girdle with respect to the container to limit expansion and minimize stretching of the collapsible container as it is filled. Once filled, the bag assembly and its contents are further frozen to a sub-zero (°F.) temperature at the dairy so that it can be transported to a remote freezer unit located at the site at which the frozen confection is to be dispensed from the collapsible container.

In other preferred embodiments, the collapsible container includes a discharge tube connected to the container at an outlet aperture and configured to extrude frozen confection. The collapsible container is stored in a freezer unit cooled by a refrigeration system. An outlet conduit is provided to connect the discharge tube to a dispensing spigot mounted on the freezer unit. Means is provided for applying enough pressure to the container to cause it to collapse and discharge frozen confection to the dispensing spigot via the discharge tube and outlet conduit. Extrusion of frozen confection at the dispensing spigot is controlled by a manually operated valve assembly.

Advantageously, the apparatus further includes cooling means surrounding the outlet conduit for cooling the outlet conduit to a subfreezing temperature using cooled air provided inside the freezer unit by the refrigeration system. Desirably, the cooling means includes a sleeve made of a thermally conductive material and the outlet conduit extends through a longitudinally extending passageway formed in the sleeve.

The sleeve has a first end section disposed in the freezer unit to expose the sleeve to the subfreezing temperature in the freezer unit and a second end section contacting the outlet conduit to enhance heat transfer between the sleeve and each of the outlet conduit and dispensing spigot. Advantageously, the outlet conduit and dispensing spigot is cooled by the sleeve to minimize melting of frozen confection in those regions of the apparatus caused by exposure to warm air circulating around the dispensing spigot outside of the freezer unit. Of course, any melting of frozen confection anywhere in the apparatus could lead to crystallization problems in the confection if the melted confection is later refrozen.

In another embodiment, the discharge tube includes a first flange connected to the collapsible container at its outlet aperture and a second flange disposed in a passageway formed in the outlet conduit. The effective area of the first flange exposed to frozen confection in the container is larger than the effective area of the second flange exposed to frozen confection in the passageway. The uniform pressure generated in the collapsible container as it is compressed by a piston means to discharge frozen confection through the discharge tube acts to apply a greater load to the first flange than is applied to the relatively smaller second flange. Accordingly, the discharge tube is moved by such a greater load in the outlet conduit passageway in a direction toward the dispensing spigot to retain the discharge tube in the passageway during compression of the collapsible container. Advantageously, this feature helps to prevent inadvertent withdrawal of the discharge tube of the collapsible container from the outlet conduit of the dispensing spigot.

The piston means used to compress the collapsible container to extrude frozen confection through the discharge tube is driven by compressed air produced by an air compressor. Desirably, the air compressor itself is situated in a cold region of the freezer unit itself so that only dehydrated refrigerated air will be drawn into the air compressor to be compressed and then provided to operate the piston means. This source of dehydrated refrigerated compressed air will help to reduce icing problems normally experienced by pistons moving in cold environments using warm compressed air. Icing can impair piston movement.

A storage locker is also provided in a location inside the freezer unit to store unused bags of frozen confection for long periods of time. Each storage locker has a separate door which is normally kept closed to protect the frozen confection stored in the locker from exposure to any warm air introduced into the freezer unit upon opening of the main access door into the freezer unit. Advantageously, the buffer against warm air provided by the storage locker reduces the likelihood that any of the frozen confection stored therein will experience melting and recrystallizing problems while in long-term storage inside the freezer unit.

The freezer unit is set up to maintain soft serve frozen confection substantially within the normal soft serve dispensing temperature range of 17° F. to 21° F. Ideally, the freezer unit will be sufficiently large to contain replacement collapsible containers filled with soft serve frozen confections as well as maintain the soft serve frozen confection in the dispensing section of the apparatus within the normal soft serve dispensing temperature range.

The soft serve frozen confection held by the collapsible container in the dispensing section has an ideal dispensing temperature. The dispensing section includes thermal insulation means for maintaining the soft serve frozen confection at a constant ideal dispensing temperature. The maintenance of a constant temperature without flucuation within the dispensing section inhibits ice crystal formation in the soft serve frozen confection that can result from temperature changes such as are encountered in the cyclic temperature fluctuations that normally result from the duty cycle of a freezing unit. The thermal insulation means can be a layer of foam or other passive thermal insulation which completely or partially surrounds the collapsible containers.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 shows an exterior view of the frozen confection-dispensing apparatus according to the present invention;

FIG. 2 is a partial interior view of the dispensing section, and shows the collapsible container of the present invention;

FIG. 3 shows an exterior view of the entire dispensing section;

FIG. 11 shows a collapsible container of the present invention and has a cut-away view showing the soft serve frozen confection;

FIG. 17 is a perspective view of the lock clip shown in FIGS. 15 and 16.

DETAILED DESCRIPTION OF THE DRAWINGS

Figure 4:
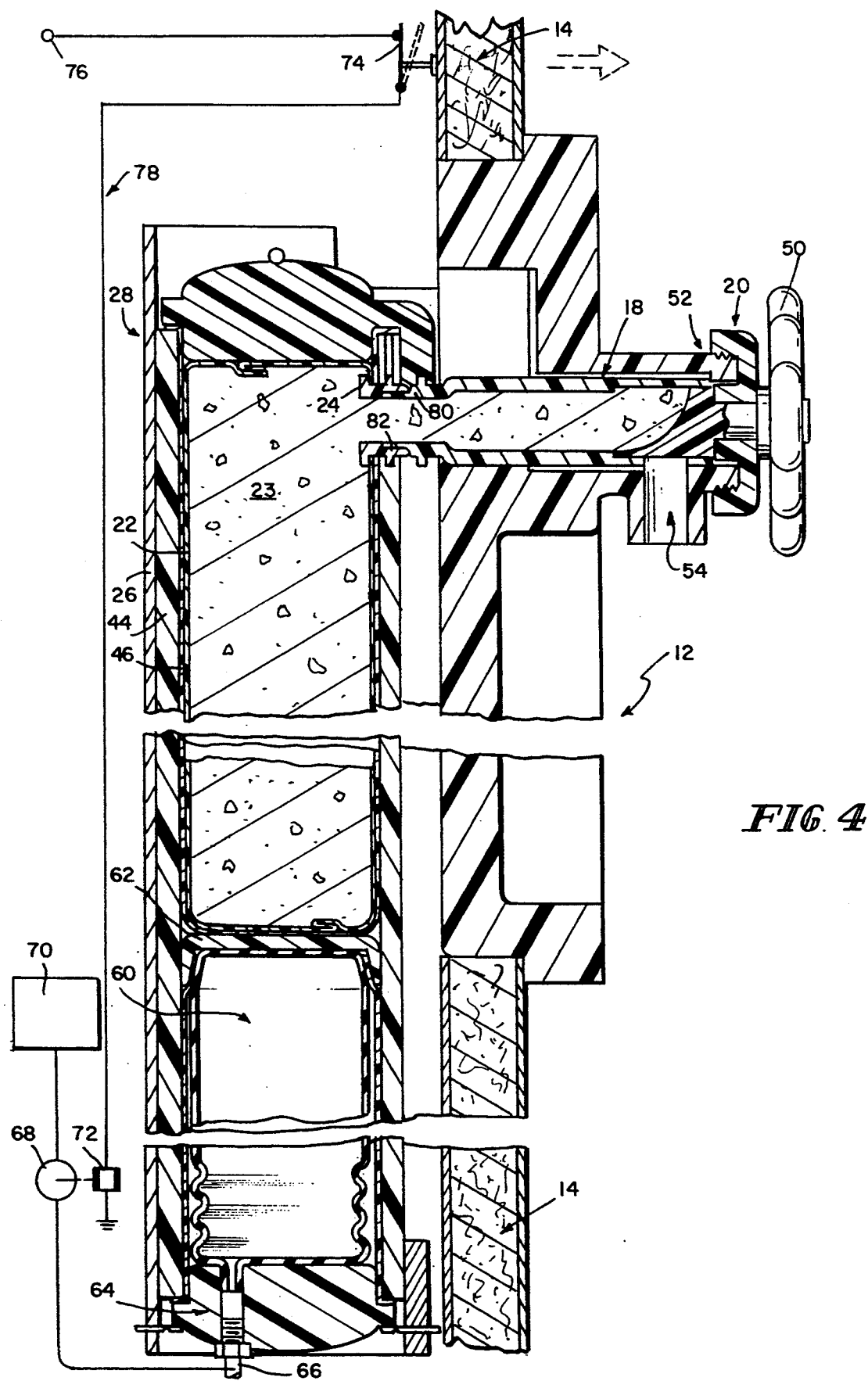
FIG. 4 is a partial cross sectional view of the frozen confection-dispensing apparatus embodying features of the present invention.

FIG. 1 is a partial view of a soft serve frozen confection dispenser apparatus 10 with an outer casing 11. A dispensing section 12, having a conduit casing 13 extends through a container door 14 of the apparatus 10. Extending outward from the conduit casing 13 is at least one dispensing conduit 18. The illustrated embodiment shown in FIG. 1 has four dispensing conduits 18, linearly aligned at equal intervals across the conduit casing 13. Each dispensing conduit 18 terminates with a manually operated valve 20 (the details of which will be discussed below in the discussion related to FIG. 4) capable of completely closing off the dispensing conduit 18. Access to the interior of the apparatus 10 is aided by the use of a door handle 16.

FIG. 3 is a complete view of soft serve frozen confection dispenser apparatus 10, presented to indicate the relative sizes of dispensing section 12 and the entire apparatus 10. The outer casing 11 of the apparatus 10 is ideally insulated to reduce heat transfer from the exterior environment to the interior of the apparatus 10. The interior temperature of the apparatus 10 should ideally be maintained within the normal range for soft service of frozen confections, approximately 17° F. to 21° F. When properly insulated, only a small freezing unit is needed to adequately compensate for heat gains from the exterior environment acquired through the outer casing 11 and upon opening of the container door 14. Certain portable embodiments of the invention (some of which will be described later) can dispense with an electrically powered refrigerating unit if blocks of dry ice are provided to maintain the normal soft service temperature. This would permit operation of the invention in areas where electrical power is prohibitively difficult to acquire or completely unavailable. Mobile transport of the soft serve frozen confection dispenser is also facilitated if electrical power is not necessary for the operation of the invention.

FIG. 11 is a view of collapsible container 22, with a cut away view revealing the soft serve frozen confection 23. The collapsible container 22 can be constructed from any material that is substantially impervious to fluids. A preferred embodiment involves the use of disposable plastic material. The collapsible container 22 may also be constructed from materials selected for their thermal insulation properties. The collapsible container 22 is fitted with a collapsible container outlet 24, which has a removable covering cap 25. Sealing the container 22 after filling with cap 25 ensures that the soft serve frozen confection is maintained in a sanitary state while being shipped to the use site. Before use, the cap 25 is easily removed.

FIG. 2 is a partial interior view of the apparatus 10. The container door 14 is opened to reveal storage area 38, which contains multiple replacement collapsible containers 40, collected together in a transport package 42. The transport package 42 can be constructed of a thermally insulative material.

In operation, the soft serve frozen confection 23 is bagged in a collapsible container 22, collected together with other similar units in a transport package 42 and shipped in a hard frozen state at sub-zero Fahrenheit temperatures. The transport package 42, containing the soft serve frozen confection 23 in a hard frozen state, is placed in the storage area 38 and allowed to slowly thaw to the normal dispensing temperature range (17° F.–21° F.) for soft serve confections in a process known as "tempering". After the soft serve frozen confection 23 has been tempered, the temperature of the confection 23 must be maintained at a constant level to prevent localized melting and refreezing which could result in an unappetizing crystallization of the soft serve frozen confection 23.

To maintain the confection 23 at a constant temperature, the dispensing unit 12 includes an insulated interior holder 26 which is divided into multiple receptacles 28 by partition walls 30. Each of the receptacles 28 is adapted to contain one of the collapsible containers 22 filled with the soft serve frozen confection 23. Since each collapsible container 22 is compressed during operation of the invention, a pressure lid 32, held in place by a keeper bar 34, is provided to ensure that the collapsible container 22 is not forced out of its proper position in the receptacle 28. Air pressure lines 36 provide air having a pressure of about 25 psi to each receptacle 28 to provide the necessary compressing force for extrusion of the confection 23.

The pressure lid 32 can be constructed of any material having sufficient strength to withstand the compressive forces exerted to enable extrusion of the soft serve frozen confection 23. A fluid-tight seal between a pressure lid 32 and receptacle 28 is not necessary for operation of the invention. The keeper bar 34 is also constructed of a material sufficient to withstand the compressive forces exerted to enable extrusion of the soft serve frozen confection 23. In the embodiment shown in FIG. 2, the keeper bar 34 is a rod with one end bent to allow correct lateral placement of the keeper bar 34. The rod is inserted through a linear series of holes in the insulated interior holder 26 and partition walls 30. The holes are placed directly above the multiple pressure lids 32. Insertion of the keeper bar 34 through the holes prevents upward displacement of the pressure lids 32 by the compressive forces exerted on the container 22 to extrude the soft serve frozen confection 23.

Alternative systems for ensuring that collapsible container 22 remain properly sited in the receptacles 28 can also be used. That a variety of locks, latches, screw attachments, sliding panels, or other similar systems will also prevent displacement of the collapsible container 22 can easily be appreciated by those skilled in the art. Also, appropriately designed interlock systems for selectively preventing the removal of pressure lids 32 can also be used as will be appreciated by those skilled in the art.

FIG. 4 is a cross sectional view of a preferred embodiment of the dispensing section 12 according to the present invention. In this preferred embodiment, the compressive force necessary to cause extrusion of the soft serve frozen confection 23 from the collapsible container 22 is provided by placing an expandible bellows arrangement under pressure. Specifically, compressive force is applied to the collapsible container 22 through the use of a bellows 60 that vertically expands in the receptacle 28. Expansion of the bellows 60 is realized through admittance of air pressurized to about 25 psi. The pressurized air is provided by a pressure source 70, connected to the bellows 60 through a pressure hose 66 and pressurizing conduit 64. The pressure hose 66 is interrupted at some point along its length by a solenoid controlled pressure valve 68.

To close the pressure valve 68, a mechanical switch 74 is provided that is opened as a result of the opening of the container door 14. When the mechanical switch 74 is opened, an interruptible circuit 78, having electrical power source 76, is broken. Without electrical power, solenoid 72 controlling the solenoid controlled pressure valve 68, will not have a magnetic field sufficient to maintain the solenoid controlled pressure valve 68 in the pressurizing position. The solenoid controlled pressure valve 68 is designed so that in the absence of a magnetic field generated by solenoid 72, the pressure in the bellows 60 is relieved. The solenoid controlled pressure valve 72 can be constructed to provide pressure relieve to pressure source 70 if desired. For portable embodiments of this invention, in which the pressure source 70 is ideally a pressurized nitrogen tank, the solenoid controlled pressure valve 72 should not relieve the pressure in the pressure source 70 when the pressure in the bellows 60 is relieved.

Relieving pressure from the bellows 60 when the container door 14 is open is a safety feature that prevents injury to a food service worker from any article that could be forcefully expelled from receptacles 28 if the bellows 60 were under pressure. The relief of bellows pressure is also necessary to safely effectuate removal of an empty collapsible container 22, and insert a replacement collapsible container 40 filled with tempered soft serve frozen confection 23. Alternative embodiments of this invention provide for manual relief of bellows pressure and pressure indicators showing the safe range of pressures for operation of this invention.

The top of bellows 60 does not directly contact the collapsible container 22. An intermediary bellows plate 62, able to slidably move in an axial direction in receptacles 28, is provided that contacts on its lower surface the bellows 60. The upper surface of the bellows plate 62 contacts a friction reduction layer 46. The friction reduction layer 46 consists of a low friction material such as a nylon bag or smooth cardboard that tightly surrounds the collapsible container 22 and acts to both reduce the frictional engagement of the collapsible container 22 with the walls of receptacle 28 and to increase the ease of collapsible container 22 insertion into the receptacle 28. The friction reduction layer 46 can also prevent leakage of any soft serve frozen confection into the bellows 60 that could result from loss of fluid integrity of the collapsible container 22. As an additional feature, the friction reduction layer 46 can be equipped with handles to increase the facility with which the collapsible container 22 is inserted and removed from receptacle 28.

Compressive forces caused by bellows 60 permit extrusion of the soft serve frozen confection 23 contained in collapsible container 22 through the collapsible container outlet 24 and into the dispensing conduit 18. In the embodiment illustrated in FIG. 4 the collapsible container outlet 24 has a female coupling section 82, lockingly engageable with the male insertion section 80 of the dispensing conduit 18. The engagement is sufficiently tight to establish fluid communication between the collapsible container outlet 24 and the dispensing conduit 18.

The extruded soft serve frozen confection 23 is confined within the dispensing conduit 18 by a blocking arrangement 52. In the illustrated embodiment shown in FIG. 4 the blocking arrangement 52 is a rotating action valve 20, but it will be understood that any feasible means of reversibly blocking and unblocking fluid flow of the extruded soft serve frozen confection 23 may be used. In operation, in the configuration illustrated in FIG. 4, the valve 20 is in a closed position, with no fluid communication permitted between the dispensing conduit 18 and a dispensing spigot 54. Rotation of the valve 20, by manually operating a dispensing handle 50, brings the dispensing conduit 18 into fluid communication with the dispensing spigot 54, thereby permitting flow of the soft serve frozen confection 23 into a suitable container (not shown), such as an edible cone or paper cup, placed immediately below the dispensing spigot 54. The valve 20 is rotated to a closed position (illustrated in FIG. 4) by manually operating the dispensing handle 50 when the desired amount of soft serve frozen confection 23 has been dispensed.

Because the proper dispensing temperature of the soft serve frozen confection 23 is critical, a layer of insulation 44 is affixed to the interior of the holder 26. The holder insulation material is preferably a polystyrene foam insulator of at least a ½ inch thickness. The holder insulation 44 acts as a permanent temperature averaging blanket that minimizes the temperature fluctuations that might otherwise be experienced by the soft serve frozen confection 23 within the holder 26.

Figure 10:
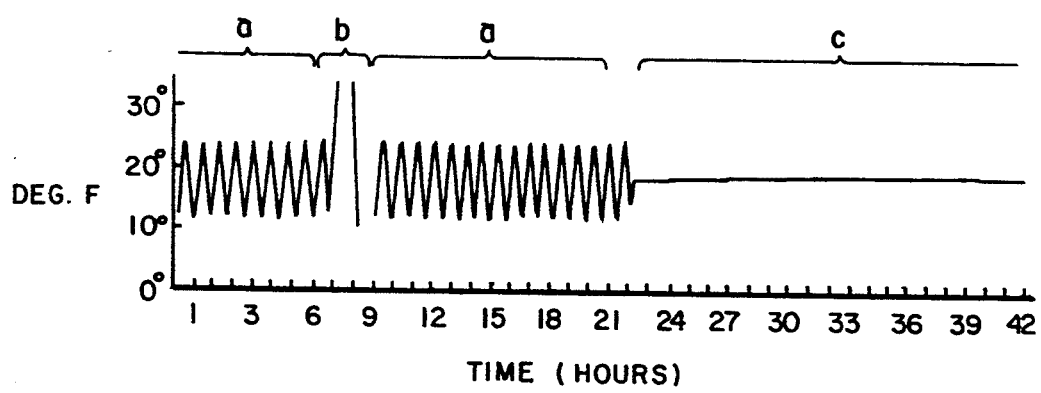
FIG. 10 is a time/temperature graph which shows the temperature of the dispensing section with both the normal refrigerator cyclic temperature variations, and when insulated in a manner such that the dispensing section becomes thermally stable.

An experiment demonstrating the thermal averaging abilities of the holder insulation 44 has been made, and the results are graphically presented in FIG. 10. A normal freezer duty cycle is shown in section A of the figure. The temperature as measured inside an uninsulated holder 26 oscillates between a low of 11° F. and a high of 24° F. during a typical freezer duty cycle of between 45 and 60 minutes. The temperature also rises dramatically during the normal defrost cycle shown in section B. When the holder 26 is insulated with holder insulation 44 at the 22nd hour of the experiment, the temperature as measured inside the insulated holder 26 remains constant until the termination of the experiment. The holder insulation 44 has the effect of averaging the thermal fluctuation experienced during the normal duty cycle of a freezer.

The maintenance of a constant temperature within the holder 26 has at least two effects necessary for the service of a soft serve frozen confection. First, the soft serve frozen confection 23 can be kept at a temperature ideal for dispensing. This is important because temperatures other than the ideal dispensing temperature imbue the soft serve frozen confection 23 with undesirable theological, tactile, and taste properties. Second, the elimination of temperature variations limits the degradation in tactile and taste properties of the soft serve frozen confection 23 by crystallization. At a constant temperature, the localized melting and refreezing that leads to crystal formation does not occur. This is especially important in regard to those soft serve frozen confections such as yogurt that are very sensitive to crystallization.

Figure 5:
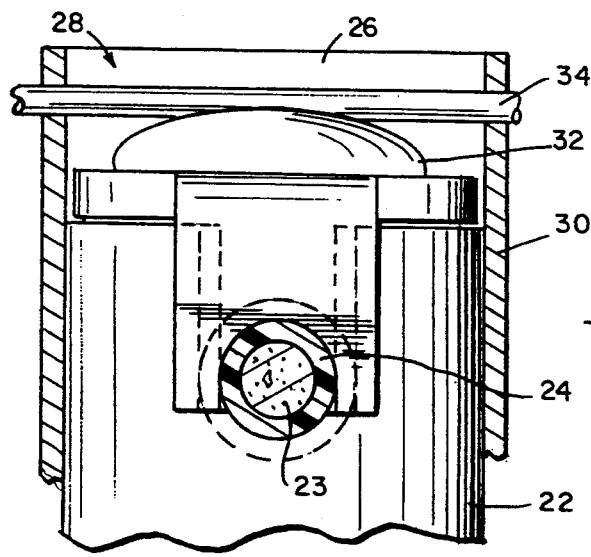
FIG. 5 is a front view of the collapsible container, showing an illustrative embodiment of the positioning of the collapsible container outlet.

FIG. 5 is a frontal view of the collapsible container 22 in position for use. The collapsible container 22 is maintained in the receptacle 28 by the partition walls 30 on two sides and by the pressure lid 32 on top. As described above, the pressure lid 32 is kept in place under compressive force by the keeper bar 34 which runs through holes linearly arranged in the partition walls 30. The collapsible container outlet 24 is maintained in the proper position for lockable engagement with the dispensing conduit 18 (not shown in FIG. 5) by a collapsible container retention ring 90 sited in a retention slot 92.

Figure 6:
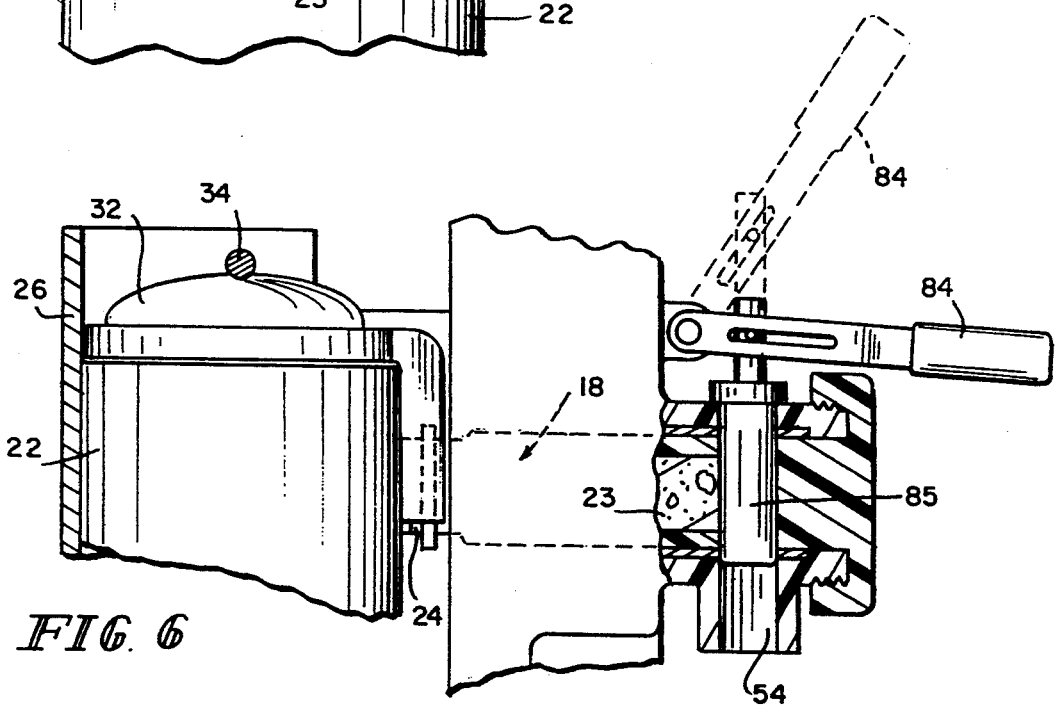
FIG. 6 is a partial side view of the dispensing section, showing a lever actuated blocking means for the dispensing conduit.

FIG. 6 is a side view illustrating an alternative blocking arrangement. Specifically, the soft serve frozen confection 23 is blocked from flow through spigot 54 by a vertical action plunger 85. A manual lever 84 can be raised (shown in dotted line) to allow dispensing of the soft serve frozen confection 23 or lowered to a horizontal position (shown in solid line), blocking flow of the soft serve confection through the spigot 54.

Figure 7:
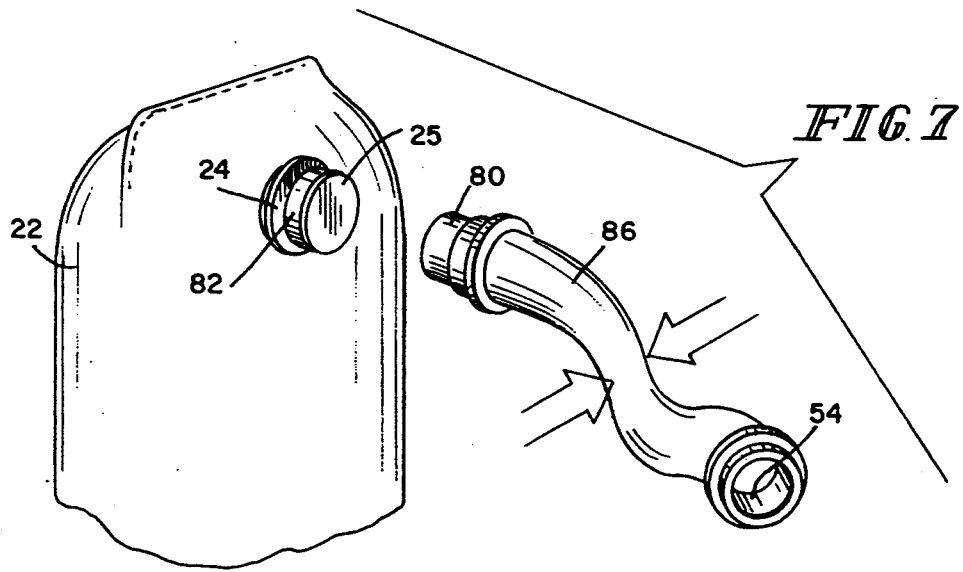
FIG. 7 is a view of a flexible dispensing conduit, with a blocking means through constriction of the flexible dispensing conduit.

FIG. 7 is a view of an alternative embodiment of a dispensing conduit and blocking arrangement. In this embodiment, a flexible conduit 86 acts to conduct the soft serve frozen confection 23 from the collapsible container 22 to an integral dispensing spigot 54. The blocking arrangement can be realized by constriction of the flexible conduit 86 in an area preferably near the dispensing spigot 54 by a constriction device (not shown). The flexible conduit 86 can be constructed of either disposable or reusable materials.

Figure 8:
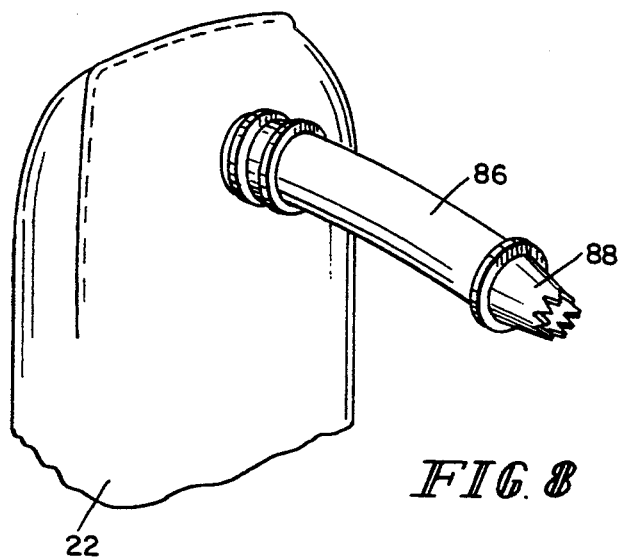
FIG. 8 is a view of a dispensing conduit having an attached decorative nozzle.

FIG. 8 shows yet another embodiment of the invention with the collapsible conduit 86 being fitted with a decorative tip 88. The decorative tip 88 can be constructed in any desired shape consistent with easy flow of the soft serve frozen confection through the decorative tip 88.

Figure 9:
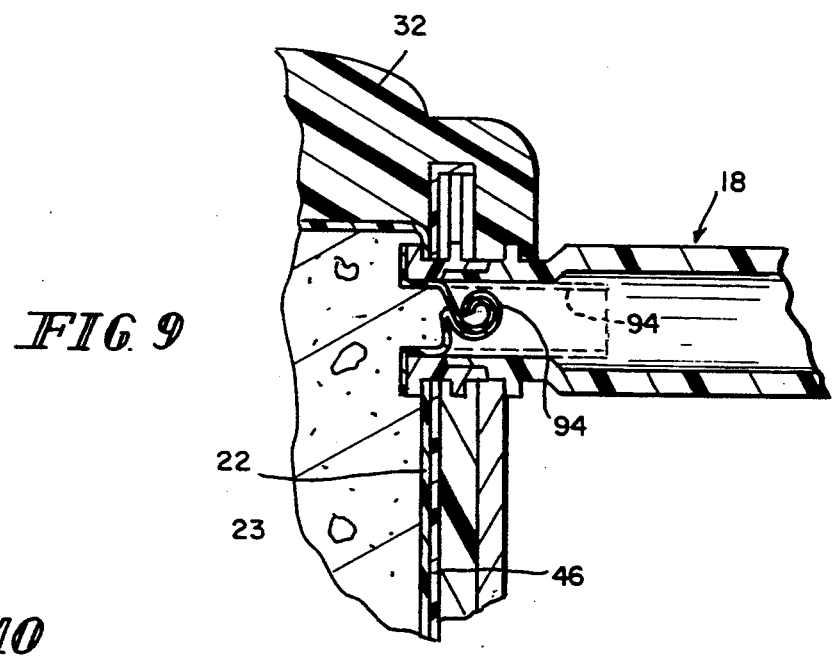
FIG. 9 is a partial cross sectional view of the frozen confection-dispensing apparatus showing a collapsible container having an attached segment that in operation unfolds to project outward into the dispensing conduit.

FIG. 9 is yet another embodiment of the invention that utilizes a flexible container outlet 94 that unrolls into the dispensing conduit 18 when subjected to the pressures caused by the extruding soft serve frozen confection 23. During transport or storage of the collapsible container 22, the flexible container outlet 94 is rolled up in a collapsed condition (shown in solid line) and can be sealed at the end to prevent contamination. Before dispensing the soft serve frozen confection 23, the seal of the flexible container outlet 94 is broken and the flexible container outlet is situated inside the dispensing conduit 18. When the soft serve frozen confection 23 is compressed, the pressure serves to unwind the flexible container outlet 94 in the dispensing conduit 18 (shown in dotted line), permitting flow of the soft serve frozen confection 23 into the dispensing conduit 18.

Figure 12:
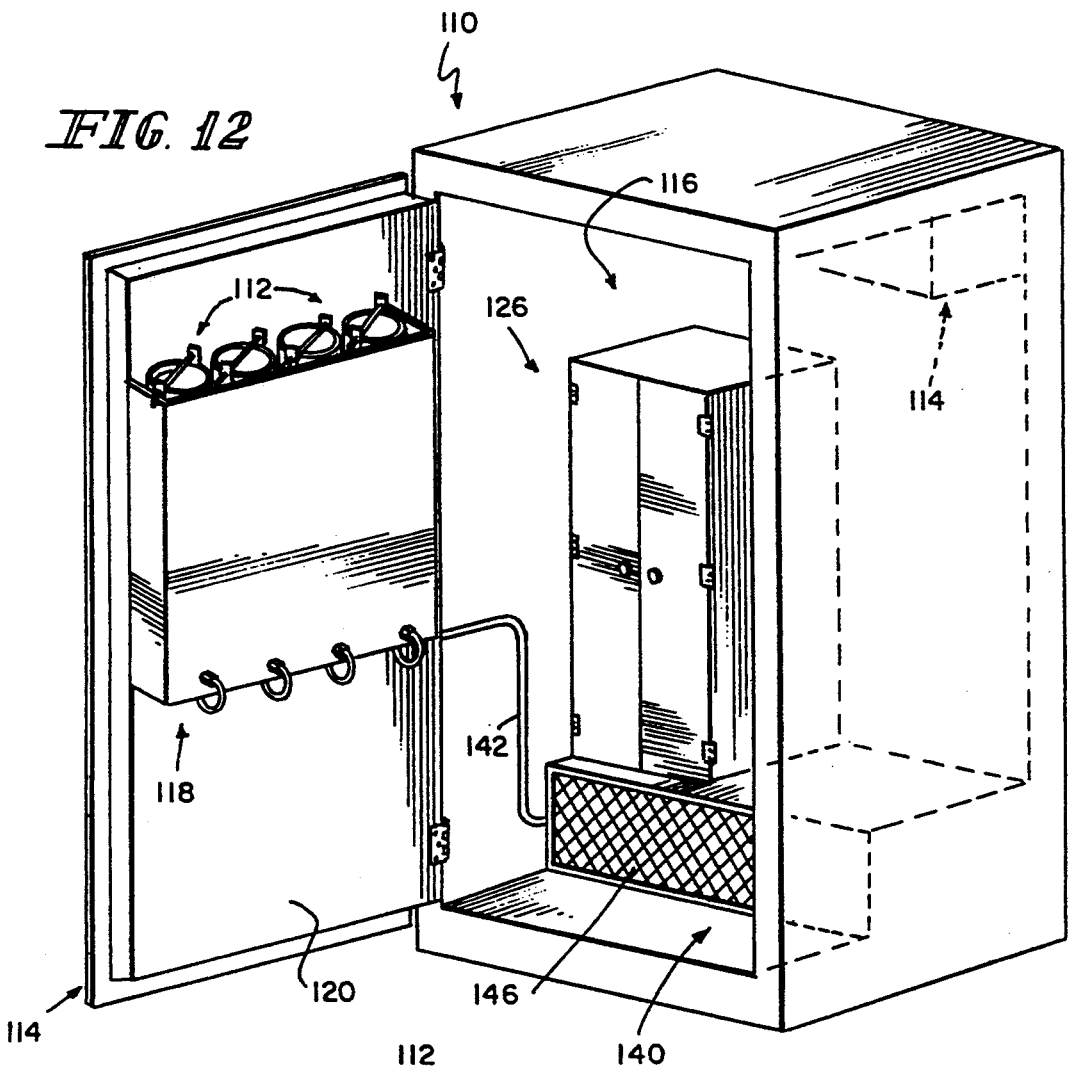
FIG. 12 is a perspective view of a frozen confection-dispensing apparatus in accordance with another embodiment of the present invention showing opening of the main access door on which four frozen confection containers are mounted to reveal a long-term storage locker setting on an air compressor.

Another embodiment of a freezer unit 110 for storing a plurality of collapsible containers 112 filled with frozen confection is illustrated in FIG. 12. The freezer unit 110 includes an access door 114 that can be swung open to provide access to the refrigerated interior region 116 of freezer unit 110. Several collapsible containers 112 are held in place in a dispensing section 118 mounted on the inside wall 120 of access door 114. These containers 112 are connected to a manually operated valve assembly 122 (see FIGS. 15 and 16) mounted on the outside wall 124 of freezer door 114.

A storage locker 126 is situated in the interior region 116 of freezer unit 110 to provide long-term storage for frozen confection containers 112. The walls and doors of locker 126 are fully insulated to protect frozen confection housed therein from exposure to warm air introduced into interior region 116 each time access door 114 is opened for any reason. Thus, frozen confection deposited into storage locker 126 is maintained at a constant temperature because there is no temperature flucuation therein while the insulated locker doors 129 remain closed.

Ordinarily, collapsible containers 112 filled with hard frozen confection will be delivered to each freezer unit 110 and placed in interior region 116 in a spot next to the storage locker 126. Although the frozen confection comes from the diary at a sub-zero (°F.) temperature, it gradually warms up to about 17° F. while it lies in the rear of interior region 116. This process called tempering causes the frozen confection to warm slowly to its serving temperature. Typically, the collapsible containers 112 are left in the shipping container (not shown) in which the containers 112 were delivered during tempering of the frozen confection stored in containers 112 in freezer unit 110. These shipping containers generally provide short-term protection against thaw and freeze cycles for the frozen confection stored therein. However, if it is expected that the frozen confection stored in containers 112 will not be needed for more than a few days, they can be deposited directly into the long-term insulated storage locker 126 upon arrival from the dairy to reduce the likelihood that any of the frozen confection stored therein will experience unwanted temperature cycling variations.

Figure 13:
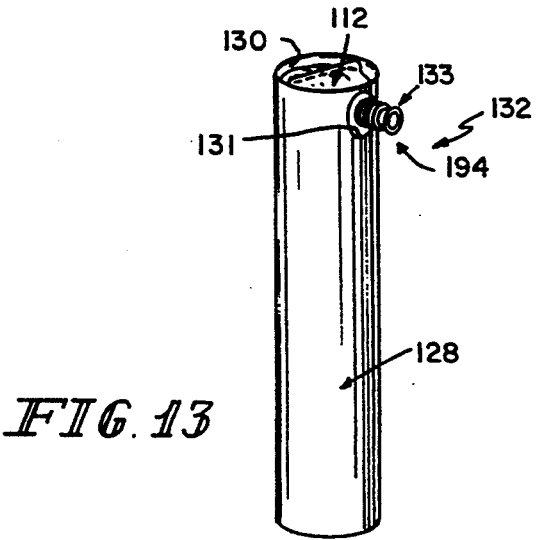
FIG. 13 is a view of a bag assembly according to the present invention showing a collapsible container disposed in a girdle sleeve and a discharge tube of the container projecting through an aperture formed in the sleeve.

Each collapsible container 112 is held inside its own girdle sleeve 128 as shown in FIG. 13. Preferably, container 112 is made of plastics sheet material and girdle sleeve 128 is made of paper. Girdle sleeve 128 is formed to include a longitudinally extending channel 130 and openings at each end. Girdle sleeve 128 can also be formed to include an aperture 131 through which the discharge tube 133 of container 112 may extend.

In assembly, an empty container 112 is deposited into channel 130 of girdle sleeve 128 so that it extends loosely along the length of girdle sleeve 128. No bond is provided to couple the container 112 to the sleeve 128. Subsequently, the container 112 is filled with partly frozen confection causing the container 112 to expand radially and longitudinally to a filled condition limited by the surrounding girdle sleeve 128. The bag assembly 132 comprising container 112 and girdle sleeve 128 can be chilled further to freeze the liquid confection in container 112 to a hard frozen, sub-zero (°F.) temperature suitable for long-term storage or transport.

Figure 14:
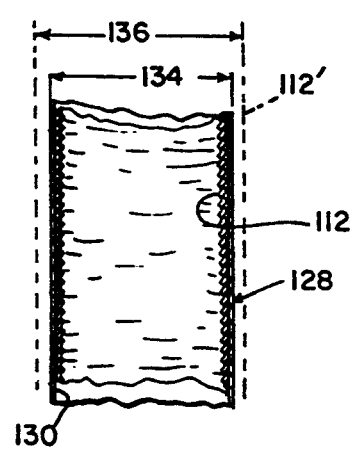
FIG. 14 is a diagrammatic view of a collapsible container in a girdle sleeve having an undersized diameter with respect to the container and showing a dotted line representation of the largest possible diameter of a container if it was filled with frozen confection without first being placed in a girdle sleeve.

As shown best in FIG. 14, the girdle sleeve 128 is undersized in diameter with respect to the collapsible container 112. Essentially, the diameter 134 of girdle sleeve 128 is less than the largest possible diameter 136 of container 112 that would be reached if a collapsible container 112' (shown in dotted lines in FIG. 14) was not placed in a girdle sleeve 128 before it was filled with partly frozen confection. In use, the girdle sleeve 128 is sized to provide means for limiting expansion of the girth of the collapsible container 112 in channel 130 as the container is filled with partly frozen confection. Thus, the actual or maximum girth of the filled collapsible container 112 is less than the largest possible diameter 136.

Advantageously, the undersized girdle sleeve 28 acts to minimize stretching of the collapsible container 112 during introduction of a partly frozen confection into the interior chamber of the collapsible container. Unwanted stretching could lead to development of internal stresses in the plastics material used to make container 112 which could then lead to container rupture problems once the filled container 112 is loaded in compression in a frozen confection-dispensing apparatus or other compression-loading apparatus.

Because container 112 has not been stretched to its breaking limit during filling, it will be understood that some extra space is available inside the container 112 to receive frozen confection moved around inside container 113 during compression loading of the collapsible container 112. Advantageously, the risk of container rupture is reduced because the girdle sleeve 128 prevents container 112 from being filled completely with frozen confection and thereby serves to protect the container 112 from bursting as it is compression-loaded by the piston means.

Sleeve 128 also prevents container 112 from sticking to the adjacent walls in dispensing section 118 as the container 112 is compressed by the piston means. Sleeve 128 also acts as a safety net for any inadvertent drip into the underlying piston area. Product identification numbers and brand names can be printed easily on paper sleeve 128. Further, sleeve 128 can be configured as shown to impart a clean cylindrical shape to the frozen confection-filled container 112, making it very easy to drop each container 112 into its receptacle provided in the dispenser section 118 without experiencing any binding problems.

Referring again to FIG. 12, an air compressor 140 is situated inside interior region 116 of freezer unit 110. Air compressor 140 supplies compressed air to the four piston means provided in dispensing section 118 by means of hose 142. The piston means operate to load collapsible containers 112 in compression to cause frozen confection to be extruded through valve assembly 122 and disposed from the dispensing section 118.

The refrigeration system 144 associated with freezer unit 118 establishes a subfreezing temperature in interior region which dehydrates and refrigerates air extant in the freezer unit 110. Placement of air compressor 140 in freezer unit 110 provides air compressor 140 with a source of cold dry air which it compresses for delivery to the dispensing section 118 via hose 142. This cold dry air is drawn into air compressor 140 through front screen 146.

Advantageously, use of dehydrated, refrigerated compressed air to drive the piston means reduces icing problems in the piston means. The piston means are cooled due to its location in the refrigerated dispensing section. It has been observed that provision of relatively warm, humid, compressed air to a refrigerated piston means could cause ice to develop and interfere with the operation of the piston means. The unique placement of air compressor 140 in the interior region 116 of freezer unit 110 mitigates this problem. As shown in FIG. 12, the storage locker 126 can be set on top of the air compressor 140.

Figure 15:
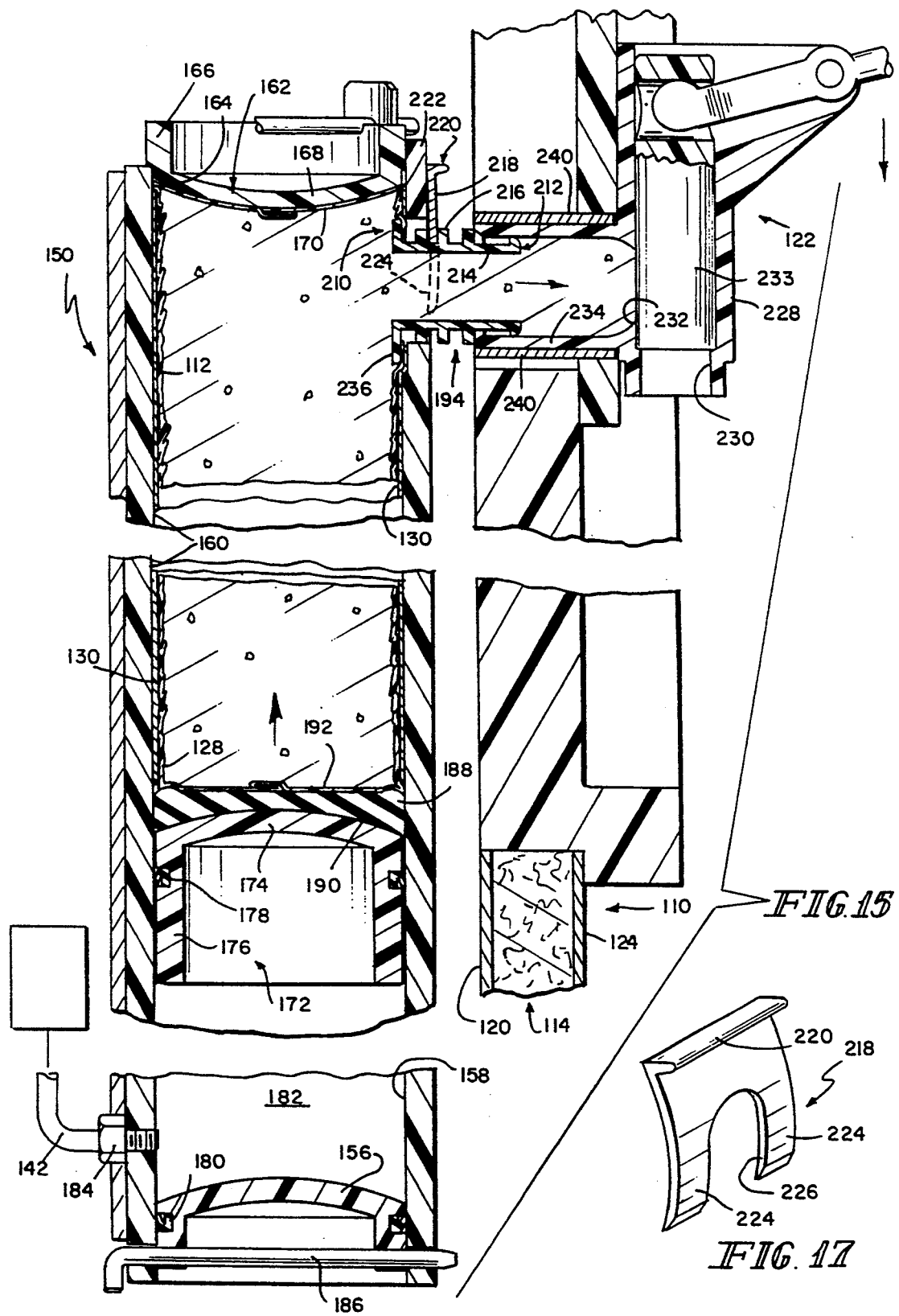
FIG. 15 is a partial cross-sectional view of the frozen confection-dispensing apparatus illustrated in FIG. 12 using a bag assembly of the type shown in FIG. 13 showing placement of the discharge tube in the passageway formed in an outlet conduit and use of a piston to apply a static load to the collapsible container while the dispensing spigot is closed.
Figure 16:
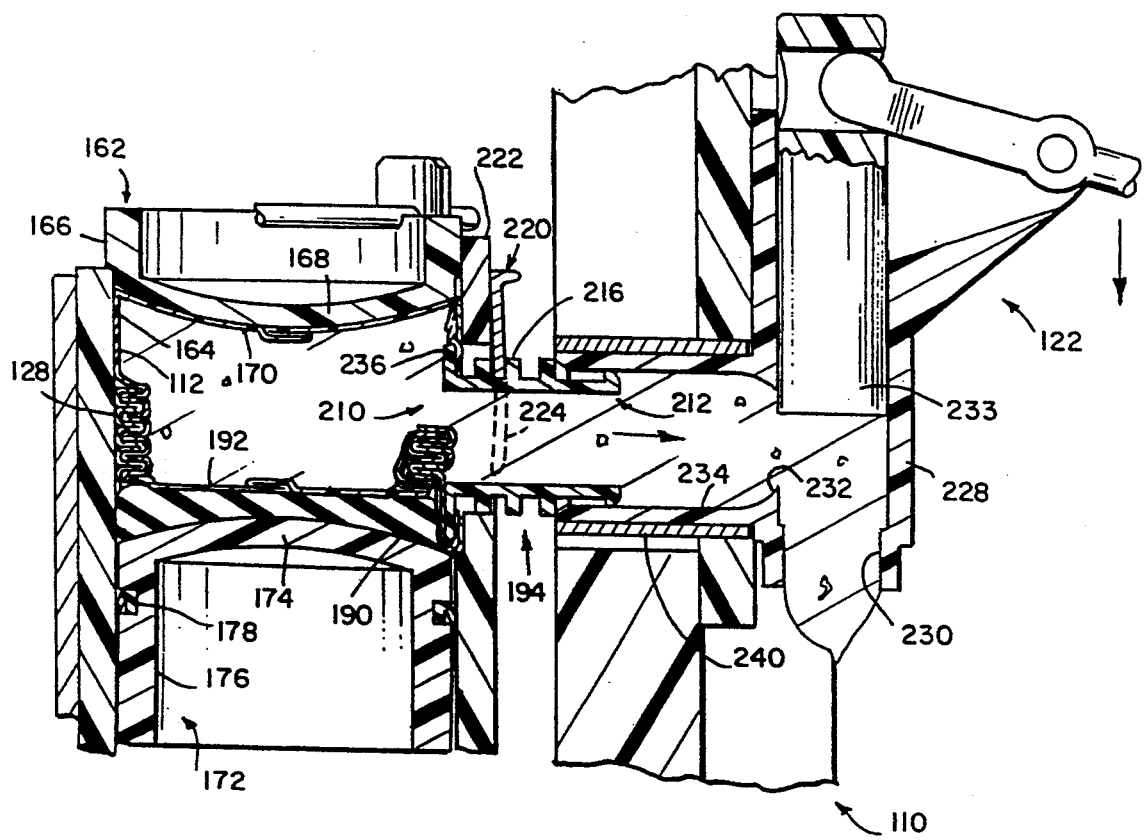
FIG. 16 is a view similar to FIG. 15 showing compression of the collapsible container and extrusion of frozen confection through the dispensing spigot under a load provided by the piston.

A receptacle 150 for receiving a bag assembly 32 in dispensing section 118 is illustrated in FIGS. 15 and 16. The receptacle 150 includes an insulated interior holder 152 and an insulation layer 154 which function to maintain frozen confection stored in bag assembly 132 held in receptacle 150 at a constant temperature without flucuation. Receptacle 150 also includes an insulated bottom lid 156 for closing a bottom opening 158 in the interior chamber 160 of receptacle 150 and an insulated top lid 162 for closing a top opening 164 in interior chamber 160.

Top lid 162 includes a mounting rim 166 connected to the top edge of receptacle 150 and a dome member 168 appended to mounting rim 166 as shown best in FIGS. 15 and 16. Illustratively, top lid 162 is a one-piece molded part made of plastics material. Dome member 168 extends downwardly into interior chamber 160 through the top opening 164. Dome member 168 preferably has a contoured surface 170 having a convex spherical shape positioned to engage the top end of the collapsible container during compression of the bag assembly 132 in receptacle 150. Advantageously, top lid 162 has this convex spherical contour or the like to relieve any possible bursting configuration that might result from using a collapsible container made from two flat sheets of plastics sheet material. These two sheets are normally sealed together at their peripheral edges. Thus, when inflated or filled, the container does not have a top end having a full circular cross-sectional shape. The inverted dome shape of top lid 162 compensates for this non-circular top end shape of the collapsible container and thus helps to reduce the prospect of container bursting problems in compression loading.

A hollow piston head 172 is disposed in a lower portion of interior chamber 160 above bottom lid 158. Piston head 172 includes an upwardly presented dome portion 174 and a depending side wall portion 176 in which a first annular sealing ring 178 is provided. A second annular sealing ring 180 is provided in bottom lid 156 so that a pressurizable chamber 182 is provided in interior chamber 160 between bottom lid 156 and piston head 172. Air pressure hose 142 is coupled to a pressure fitting 184 to provide means for introducing dry, refrigerated, compressed air generated by air compressor 140 into pressurizable chamber 182. An anchor rod 186 extends through apertures formed in receptacle 150 and bottom lid 162 to fix the axial position of bottom lid 162 in the interior region 160 adjacent bottom opening 158.

A deformable pad 188 is disposed on top of the upwardly facing dome portion 174 at the top of the piston head 172 as shown in FIGS. 15 and 16. The pad 188 is thus positioned to lie in the space between the top of the piston head 172 and the bottom of the collapsible container 112. The pad 188 is made of a suitable material that deforms under compression so that its bottom surface 190 matches the contour of the dome portion 174 and its top surface 192 and establishes a substantially flat surface engaging the collapsible container 112. Advantageously, the pad 188 deforms as required to maximize discharge of frozen confection from the interior Of the collapsible container 112 as it is compressed between the top lid 162 and piston head 172 during upward movement of piston head 172.

A discharge tube 194 extends through an outlet aperture 196 formed in collapsible container 112 near its top end to provide a passage for discharging frozen confection from the interior of container 112 under compression loading. Discharge tube 194 includes a first radially outwardly extending flange 210 disposed inside the collapsible container 112, a second radially outwardly extending flange 212 located outside of container 112, and a tubular wall 214 extending therebetween. A plurality of ribs 216 lie between flanges 210 and 212 and are positioned to lie in axially spaced-apart relation as shown in FIG. 15 to form a channel for receiving a lock clip 218.

Lock clip 218 is made of spring material and has a top end 220 that biases against a mounting bracket 222 appended to the top end of receptacle 150 and a pair of depending fingers 224 for engaging ribs 216 while a cutout 226 between the two fingers 224 receives the tubular section 214 of discharge tube 194. Essentially, the pair of fingers 224 straddle the discharge tube 194 and limit axial movement of the discharge tube 194 into and out of the outlet aperture formed in the collapsible container 112.

The valve assembly 122 includes a spigot 228 having a discharge outlet 230 and an intake inlet 232 and a lever-actuated valve member 233 movable in the spigot 228 between a closed position blocking the flow of frozen confection into spigot 228 via the intake inlet 232 as shown in FIG. 15 and an open position shown in FIG. 16. An outlet conduit 234 has a proximal end coupled to the spigot to place the outlet conduit 234 in communication with the intake inlet 132 and a distal end formed to include an aperture for receiving the distal end of the discharge tube 194 therein.

The relatively larger effective area of first flange 210 as compared to the second flange 212 functions to cause discharge tube 194 to be pushed into outlet conduit 234 when the piston head 172 is moved to load the bag assembly 132 in compression. Piston head 172 acts to apply a static load to frozen confection residing in the collapsible container 112, the discharge tube 194, and outlet conduit 234 while the valve member 233 is in its closed position blocking discharge of frozen confection. This static load pressurizes the frozen confection extant in collapsible container 112 and dispensing spigot 228 to about a uniform pressure. The first flange 210 has a first effective area 236 exposed to pressurized frozen confection extant in the interior chamber of collapsible container 112. The second flange 212 has a second effective area 238 exposed to pressurized frozen confection extant in the passageway formed in the outlet conduit 234.

The first effective area 236 is relatively larger than the second effective area 238 to generate a movement-inducing load applied to the first flange 210 by pressurized frozen confection in the collapsible container 112 that is relatively larger than any movement-inducing load applied to the second flange 212 by pressurized frozen confection in the outlet conduit passage. Accordingly, the discharge tube 194 is moved in the outlet conduit passage in a direction toward the intake inlet 232 in the spigot 228 to retain the discharge tube 194 in the outlet conduit passage in response to presence of compressed air in excess of a predetermined magnitude in the pressurizable chamber 182. Essentially, outward pressure on the back of first flange 210 around the outlet aperture 196 presses the discharge tube fitting 194 into the spigot body.

As shown also in FIGS. 15 and 16, a thermosleeve 240 is provided around outlet conduit 234 to provide means for using refrigerated air in the freezer unit 210 to cool the outlet conduit to a subfreezing temperature. The thermosleeve 240 is a highly conductive metal sleeve which carries the chilling effect of cold air in interior chamber 116 outward to the outermost part of the outlet conduit 234 at the spigot 228 to minimize melting of frozen confection therein. The thermosleeve 240 is made of a thermally conductive material to enhance conductive heat transfer between the thermosleeve 240 and the outlet conduit 234. Thermosleeve 240 is preferably made of copper and may include one or more radially outwardly extending fins (not shown) to help refrigerate the outlet conduit 234.

Although the invention has been described in detail with reference to specific preferred embodiments and specific examples, variations and modifications exist within the scope of the invention as described in the following claims.

What is claimed is:

1. A frozen confection-dispensing apparatus comprising:
   containing means for containing a frozen confection in a closed chamber;
   means for holding the containing means in a receptacle;
   an elongated sleeve including a longitudinally extending channel, the containing means being disposed in the longitudinally extending channel, the elongated sleeve and the containing means cooperating to provide a bag assembly disposed in the receptacle, the containing means being a collapsible bag and the elongated sleeve being made of a deformable material to permit compaction of the bag assembly in the receptacle during dispensing of the frozen confection through the discharge outlet; and,
   means for dispensing frozen confection from the continuing means to a point of use outside of the holding means.

2. The dispensing apparatus of claim 1, wherein the collapsible bag includes a discharge tube connected to the dispensing means and further comprising compressing means for compressing the collapsible bag and the deformable sleeve in the receptacle to discharge frozen confection from the closed chamber through the discharge tube so that frozen confection from the collapsible bag is extruded into the dispensing means for delivery to the point of use as the bag assembly is compacted in the receptacle.

3. A frozen confection-dispensing apparatus comprising a collapsible container formed to include an outlet aperture and an interior chamber communicating with the outlet aperture, a dispensing spigot formed to include a passageway having an inlet and an outlet, valve means in the dispensing spigot for selectively blocking flow of frozen confection through the passageway, the valve means being movable between a passageway-opening and a passageway-closing position, a discharge tube interconnecting the outlet aperture of the collapsible container and the inlet of the passageway in fluid communication to conduct frozen confection from the interior chamber of the collapsible container to the passageway of the dispensing spigot, the discharge tube including a first flange connected to the collapsible container at the outlet aperture and a second flange disposed in the passageway of the dispensing spigot, and means for compressing the collapsible container to discharge frozen confection from the interior chamber through the outlet aperture so that frozen confection in the collapsible container is extruded into the passageway by the discharge tube, the compressing means acting to apply a static load to frozen confection disposed in the collapsible container, extrusion tube, and passageway upon movement of the valve means to its passageway-closing position to pressurize frozen confection extant in the collapsible container and the dispensing spigot to about a uniform pressure, the first flange having a first effective area exposed to pressure extant in the interior chamber, the second flange having a second effective area exposed to pressure extant in the passageway, the first effective area being greater than the second effective area to generate a movement-inducing load applied to the first flange by pressurized frozen confection in the interior chamber that is relatively larger than any movement-inducing load applied to the second flange by pressurized frozen confection on the passageway so that the discharge tube is moved in the passageway in a direction toward the outlet of the passageway to retain the discharge tube in the passageway formed in the dispensing spigot in response to operation of the compressing means.

4. The dispensing apparatus of claim 3, wherein the first flange is disposed inside the interior chamber and includes a first surface exposed to pressure extant in the interior chamber and a second surface connected to the collapsible container.

5. A frozen confection-dispensing apparatus comprising an elongated hollow receptacle having a first opening at one of its ends, a second opening at the other of its ends, and a passageway extending between the first and second openings, containing means for containing a frozen confection in the interior chamber, the containing means being disposed in the passageway, the containing means including means for conducting frozen confection from the interior chamber to a point of use outside the receptacle, the containing means being a collapsible bag made of a deformable material, closing means connected to the hollow receptacle for closing the first opening to block passage of the containing means therethrough, the closing means includes a closure lid having a mounting rim connected to the hollow receptacle and a dome member appended to the mounting rib and situated to extend into the passageway through the first opening, the dome member having a contoured surface positioned to engage a portion of the collapsible bag during compression of the collapsible bag in the passageway, and means connected to the hollow receptacle to extend into the second opening for compressing the containing means in the passageway to discharge frozen confection from the interior chamber through the conducting means.

6. The dispensing apparatus of claim 5, wherein the contoured surface is a convex spherical section.

7. The dispensing apparatus of claim 5, wherein the closing means and the hollow receptacle cooperate to define a third opening in the receptacle upon mating engagement of the closing means and the hollow receptacle, and the conducting means extends through the third opening to conduct frozen confection from the interior chamber formed in the containing means to a point of use outside of the receptacle.

8. The dispensing apparatus of claim 5, wherein the compressing means includes a piston head movable in the passageway and a deformable pad disposed in the passageway to lie intermediate the piston head and the containing means and move with the piston head.

9. The dispensing apparatus of claim 8, wherein the receptacle includes a cylindrical inner wall defining the passageway, the containing means is a collapsible bag made of deformable material, the piston head includes a cylindrical side wall slidably engaging the cylindrical inner wall of the receptacle and a dome member appended to one end of the cylindrical side wall and configured to support the deformable pad thereon, and the deformable pad deforms under compression substantially to match the contour of the dome member and establish a substantially flat surface engaging the containing means to maximize discharge of frozen confection from the interior chamber of the collapsible container as it is compressed between the closing means and the deformable pad during operation of the compressing means.

10. A frozen confection-dispensing apparatus comprising a freezer unit having a refrigeration system therein and formed to include a first closed storage area therein sized to receive at least one collapsible frozen confection container, means for dispensing frozen confection from the frozen confection container in the first closed storage area to a point of use outside of the freezer unit, said refrigeration system establishing a subfreezing temperature to dry air extant in the first closed storage area and cool each frozen confection container disposed therein, and means for applying pressure to the frozen confection container to discharge frozen confection from the frozen confection container to a point of use outside of the freezer unit through the dispensing means, the applying means including an air compressor means situated in the first closed storage area for compressing cold dry air produced by the refrigeration system to generate pressure to collapse the frozen confection container.

11. The apparatus of claim 10, wherein the freezer unit includes an elongated hollow receptacle formed to include a passageway, the frozen confection container is disposed in the passageway, and the applying means further includes a piston head movable in the passageway to apply pressure to frozen confection in the frozen confection container and means for using cold dry compressed air generated by the air compressor means to move the piston head in the passageway.

12. The apparatus of claim 10, further comprising a storage locker formed to include a second closed storage area sized to receive at least one frozen confection container, the storage locker being fully contained within the first closed storage area provided by the freezer unit.

* * * * *